Figure 1:
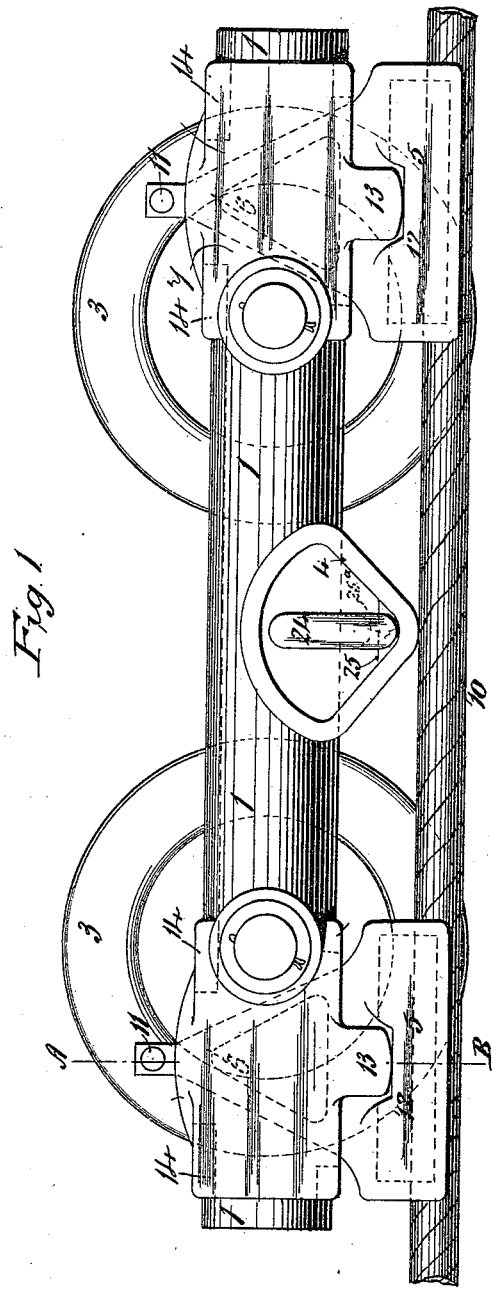

(No Model.) 5 Sheets—Sheet 1.

J. P. ROE.
APPARATUS FOR TRANSPORTING LOADS BY MEANS OF TRAVELING ROPES OR CABLES.

No. 438,949. Patented Oct. 21, 1890.

Witnesses
W. Cross
W. H. Frost.

Inventor
John Pearce
Atty (No Model.) 5 Sheets—Sheet 2.
J. P. ROE.
APPARATUS FOR TRANSPORTING LOADS BY MEANS OF TRAVELING ROPES OR CABLES.
No. 438,949. Patented Oct. 21, 1890.
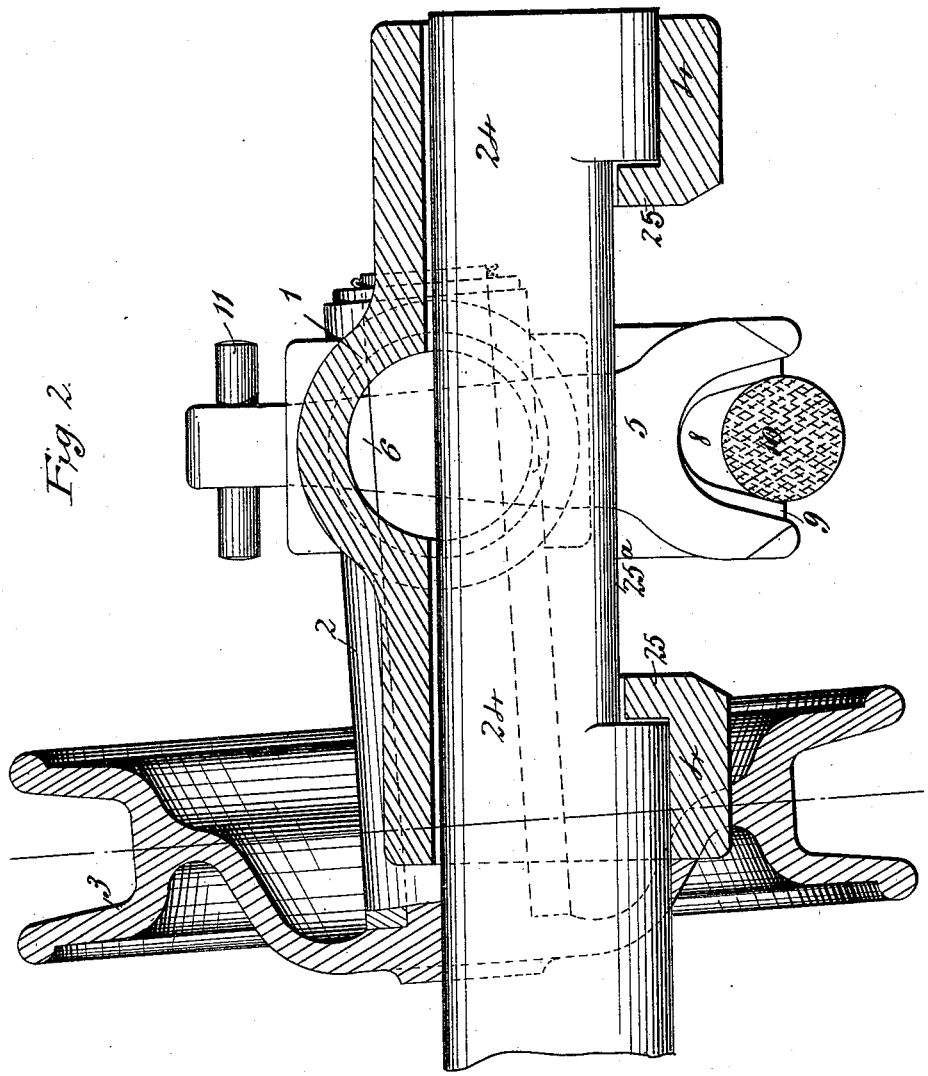

(No Model.) 5 Sheets—Sheet 3.
J. P. ROE.
APPARATUS FOR TRANSPORTING LOADS BY MEANS OF TRAVELING ROPES OR CABLES.
No. 438,949. Patented Oct. 21, 1890.
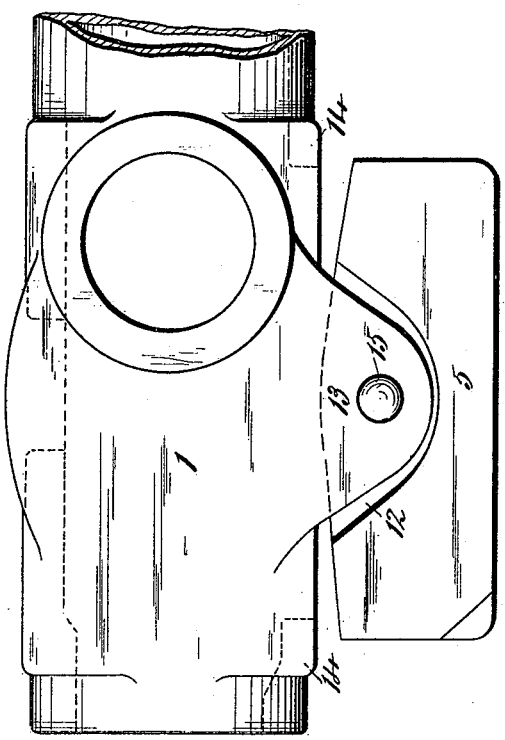
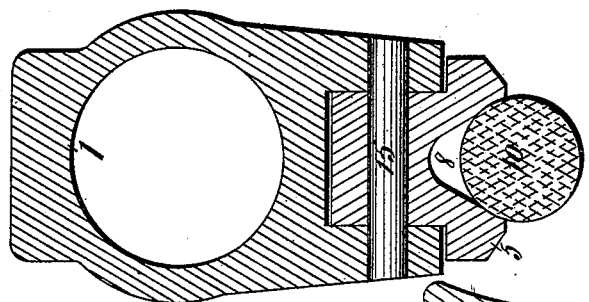
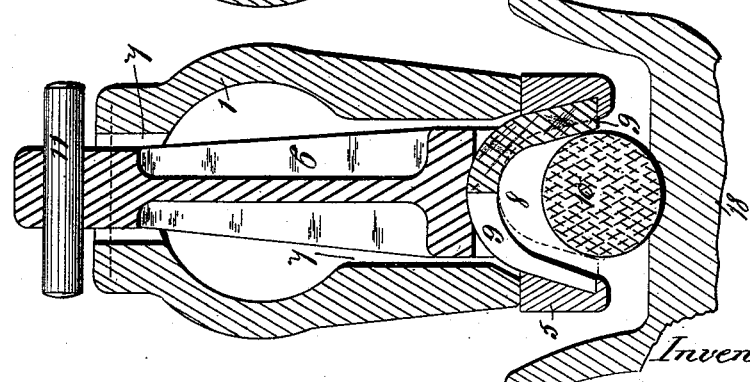

(No Model.)  5 Sheets—Sheet 4.
J. P. ROE.
APPARATUS FOR TRANSPORTING LOADS BY MEANS OF TRAVELING ROPES OR CABLES.
No. 438,949.  Patented Oct. 21, 1890.
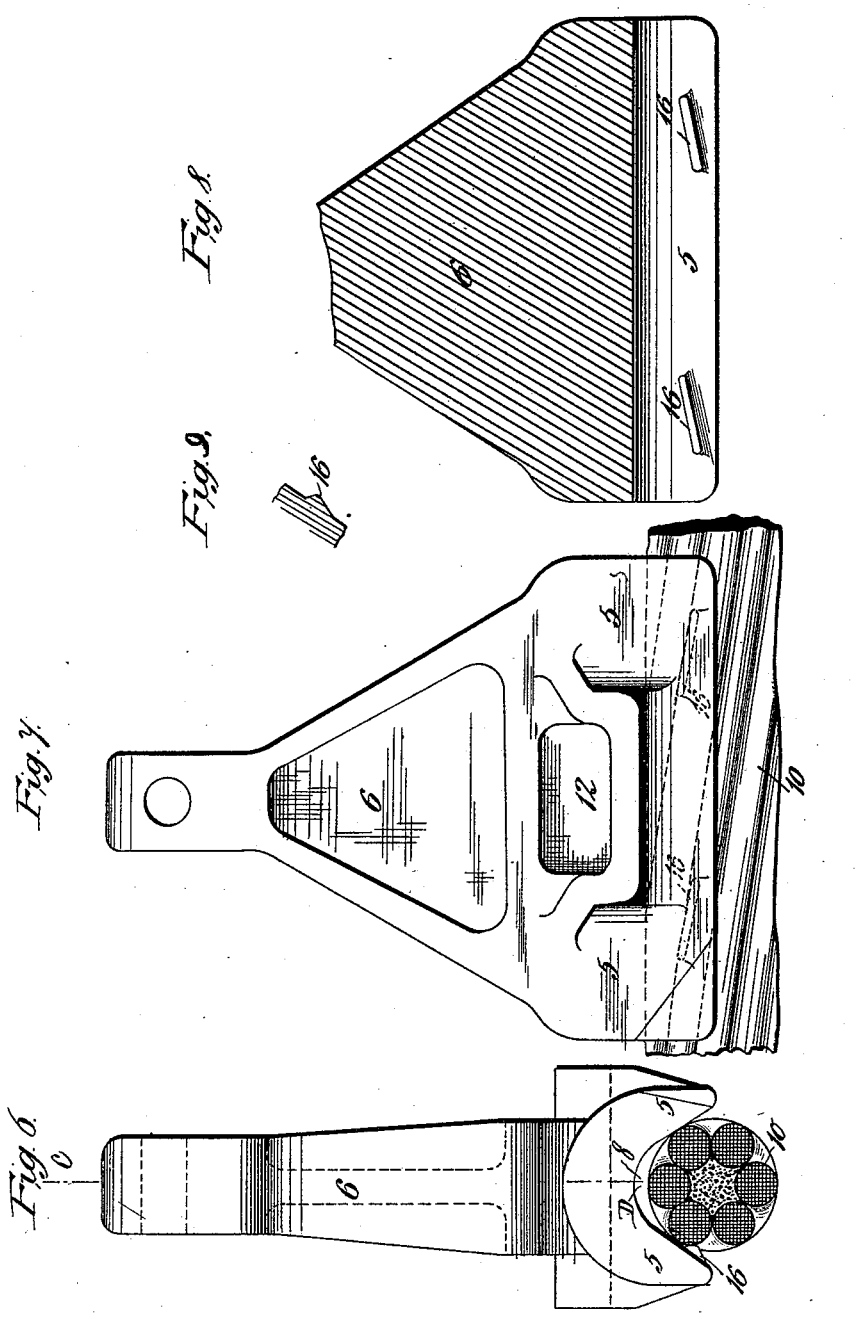

(No Model.) 5 Sheets—Sheet 5.
J. P. ROE.
APPARATUS FOR TRANSPORTING LOADS BY MEANS OF TRAVELING ROPES OR CABLES.
No. 438,949. Patented Oct. 21, 1890.
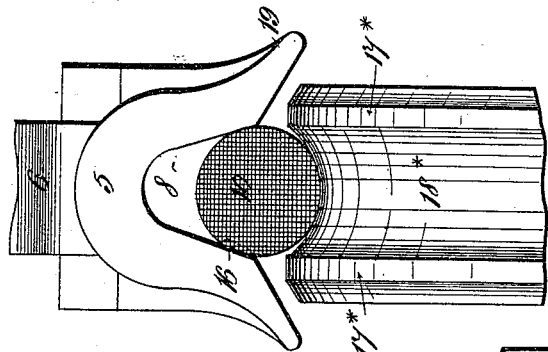
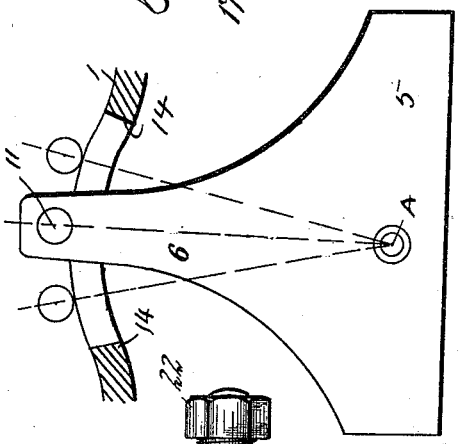
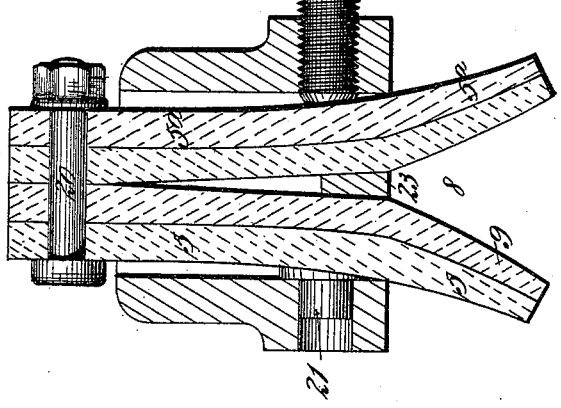
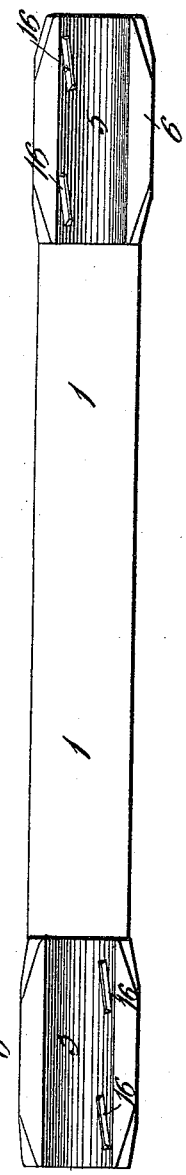
Witnesses
E. C. Duffy
Chas. M. Werle
Inventor:
J. P. Roe
By C. E. Duffy
Attorney

UNITED STATES PATENT OFFICE.

JOHN PEARCE ROE, OF UPPER TOOTING, ENGLAND.

APPARATUS FOR TRANSPORTING LOADS BY MEANS OF TRAVELING ROPES OR CABLES.

SPECIFICATION forming part of Letters Patent No. 438,949, dated October 21, 1890.

Application filed July 22, 1889. Serial No. 318,311. (No model.) Patented in England November 3, 1888, No. 15,913, and in Spain February 12, 1889, No. 8,953.

*To all whom it may concern:*

Be it known that I, JOHN PEARCE ROE, a subject of the Queen of Great Britain and Ireland, residing at Upper Tooting, in the county of Surrey, England, have invented Improvements in Apparatus for Transporting Loads by Means of Traveling Ropes or Cables, (for which I have obtained a patent in England, No. 15,913, dated November 3, 1888, and in Spain, No. 8,953, bearing date February 12, 1889,) of which the following is a specification.

This invention relates to the kind of apparatus for transporting loads in which a part or parts of the apparatus to which the load is suspended rests or rest upon a traveling rope or cable which supports and moves the entire apparatus and its load. Such a traveling rope or cable is hereinafter referred to as a "cable." A frame or backbone of any suitable construction provided with bearings or axles for a shunt-wheel and for a hanger to carry a bucket or load is furnished with blocks, devices, or parts, hereinafter called "blocks," each grooved or recessed in such manner as to grip or take upon or engage with or hold onto the cable, (when the apparatus is in place upon the cable,) as I will proceed to explain.

According to one arrangement the block is formed with a groove or recess made of a form resembling a wedge, as seen in cross-section, with its two sides at an angle to one another of, say, sixty degrees or less, the arrangement being such that the block will press with its inclined surfaces upon and be supported by the cable along lines of contact corresponding to the angle of the wedge, the grip or hold of the block upon the cable being proportional to the angle to one another of the inclined surfaces of the groove and to the load. In another arrangement the block is made with a groove or recess of suitable form (it may be wedge-like, as seen in cross-section) and has a part or parts adapted to engage with the helical lay of a strand or strands of the cable. With this construction the apparatus and cable will in use become practically locked together. The block or blocks can be made in one with or be rigidly secured to the frame or backbone; but usually I pivot or articulate or otherwise adapt the blocks (or each block) to the frame or backbone in such a manner as to enable the block to automatically adjust itself to any upward or downward curvature of the cable—as, for instance, where the cable passes over a sheave or sheaves—and so to maintain a fair bearing upon the cable.

To increase the friction between the sides of the groove and the cable, I in some cases line the groove at one or both sides with any material or compound suitable for the purpose, such as leather or soft metal.

In the accompanying drawings, Figure 1 is a side view, and Fig. 2 transverse section, partly in elevation, illustrating apparatus constructed according to this invention. Fig. 3 is a transverse section of the same on the line A B, Fig. 1, and showing the gripping-block passing between the high flanges of a wide cable-sheave. Figs. 4 and 5 are respectively a side view and a transverse section illustrating a modified construction of gripping-block with part of the frame or backbone to which it is jointed. Figs. 6 and 7 are respectively end and side elevations of a grooved block with projecting parts adapted to engage with the under surfaces of the helically-twisted strands of a cable. Fig. 8 is a longitudinal section on the line C D, Fig. 6. Fig. 9 is a sectional detail view. Fig. 10 is a diagrammatic view, hereinafter referred to. Fig. 11 is a detail view of a gripping-block with splayed lower sides for passing a narrow cable-sheave, part of which is shown in elevation. Fig. 12 is a cross-section illustrating a divided block. Fig. 13 is a section showing the extension 6 of the block 5 extending through the slot, the ends 14 14 of which form stops to limit the vibration of said block.

In Figs. 1, 2, 3, 5, 6, 7, and 11 the apparatus is shown applied to a cable.

Fig. 1 is drawn to a smaller scale than the remaining figures.

In Figs. 1, 2, and 3, 1 is a frame or backbone, that may advantageously be made of tubular form, as shown, and constructed with bearings 2 for the shunt-wheels 3 and with a bearing 4 for a hanger that supports the load to be transported. 5 5 are gripping-blocks, each provided with an upward extension 6, that passes through an opening 7, formed in the frame or backbone. (See Fig. 3.) Each block is formed in its under side with a wedge-shaped groove 8, that may be lined, as shown in Figs. 3 and 12, with a strip 9 of material—such as leather—that bears directly against the cable 10 for the purpose hereinbefore mentioned. In some cases the lining may be dispensed with. 11 11 are pins carried by the block-extensions 6. They are each adapted to bear upon the top of the frame or backbone and suspend its corresponding block in position when the same is not applied to a cable. Each block is formed at its upper side with recesses 12, into which take downwardly-projecting extensions 13, each formed with a curved lower bearing-surface, against which the upper surface of the recess 12 bears when the apparatus is supported by the cable, as shown, and upon which the block may turn or oscillate to adjust itself to any vertical curvature of the cable, as hereinbefore mentioned. 14 14 are stops or abutments that serve to limit the turning movement of the blocks.

A block formed with a wedge-shaped groove, as shown, will grip the cable with a force proportional to the angle between the sides of the groove and to the weight of the load acting vertically or at right angles to the cable's length.

Each block, instead of being formed with extensions 6 and supported in the manner shown in Figs. 1 to 3, may be formed as shown in Figs. 4 and 5, in which it is shown journaled to the lower part of the frame 1 by a pin 15, the frame-extensions 13, which take into the recesses 12, formed in the sides of the block, serving to limit the turning movement of such block.

In Figs. 6, 7, 8, and 9 one side of the groove 8, which is shown of wedge shape, is formed with angular or helical parts 16, that are in the example shown in the form of projections, each adapted to fit into the angular groove or space between two adjacent helically-twisted strands of the cable, as shown, after the manner of the screw-thread of a nut fitting a correspondingly screw-threaded rod. These angular projections or parts (or there may be only one) are so arranged with reference to the lay of the cable that they each tend to descend and engage with the under side of a downwardly-inclined strand of the cable, and thereby wedge or force the block and cable together. The under side of each projection may advantageously be made inclined with reference to the side of the groove, as shown in cross-section in Fig. 9, in order that it shall not rise upon the upper surface of a strand of the cable and remain there by the pressure of the block due to the load suspended from the apparatus.

With a grooved block formed with a part or parts to engage with the cable, as herein described, the resistance of the block to slip upon the cable, and the pressure between the cable and the sides of the groove when the apparatus is upon a gradient will be proportional to the angle between the sides of the groove when a wedge-shaped groove is employed and to the load pressure combined with the locking action of the helical part or parts due to its or their engagement with the downwardly-inclined surfaces of some of the strands of the cable, as hereinbefore described.

To render the apparatus equally efficient whether ascending or descending gradients, it can be provided with grooved blocks at each end, the projections or parts 16, with which the groove of the forward block is formed to engage with the cable, being arranged reversely to those of the rear block, as shown diagrammatically in Fig. 10, which is an inverted view of the backbone 1 and grooved blocks.

In lieu of projections 16, one or both sides of the groove 8 may be formed with recesses adapted to fit and engage with the helically-twisted strands of the cable.

In Fig. 6 both of the metallic surfaces of the grooves are shown bearing directly against the cable; but the side opposite to that provided with the projections may be lined with leather or other suitable material in a manner that will be readily understood from Fig. 3.

The blocks 5 may each be formed, as shown in Figs. 1 to 5, so that the inclined sides of the groove will extend downward only a short distance below the lines of contact with the cable, and may be of such dimensions as to readily pass between the high flanges 17 of a wide cable-sheave 18, as shown in Fig. 3; or the sides of the block below the lines of contact with the cable may be splayed outward and downward, as shown at 19 in Fig. 11, so as to be able to readily pass over and outside the low flanges 17* of a narrow cable-sheave 18*, as shown.

Each block may in some cases be made in parts 5 5ª, as shown in Fig. 12, that are connected in such a manner (as, for example by bolts 20) as to admit of the size of the groove being adjusted from time to time to suit differences in the diameter of cables, such, for example, as may result from wear or other causes.

A projection 21 on the part 5 of the divided block and a set-screw 22, bearing against the other part 5ª, serve to admit of the block being readily fixed in position in the frame or backbone. 23 is a wedge-shaped plate placed between the parts of the block to keep them sufficiently apart.

In some cases—as, for instance, when there are no steep gradients—the frame or backbone may be provided with a gripping-block at one end only, its other end merely resting upon without gripping the cable.

The hanger-bearing 4, Figs. 1 and 2, is made of approximately-triangular form, as seen from the side of the apparatus, and is provided with upwardly-extending projections 25, while the hanger 24, which is in the form of a flat bar with lower curved surface, is recessed at 25ª, as shown, to receive such projections. With this construction if the upper end of the hanger be inserted into the triangluar hole when the hanger is in a horizontal position and then be turned into the vertical position shown in Figs. 1 and 2, so that the projections 25 are within the recess at 25ª, the hanger will be prevented from leaving its bearing, while it will be free to oscillate or turn upon the bearing. The part of the frame or backbone between the projections 25 may advantageously be removed, as shown.

What I claim is—

1. In apparatus for transporting loads by means of traveling ropes or cables, a block formed with a groove or recess of wedge shape in cross-section to receive a traveling rope or cable and having one or more projecting parts adapted to engage with the helically-arranged strands of a cable, substantially as herein described, for the purpose set forth.

2. In apparatus for transporting loads by means of traveling ropes or cables, a block formed with a groove 8 of wedge shape in cross-section and having one or more helically-arranged projections, such as 16, substantially as herein described, for the purpose set forth.

3. In apparatus for transporting loads by means of traveling ropes or cables, the combination of a frame or backbone provided with projections and a block formed with a groove of wedge shape in cross-section and with recesses to receive said projections, said block being arranged to be capable of turning on said projections, substantially as herein described, for the purposes specified.

4. In apparatus for transporting loads by means of traveling ropes or cables, the combination of a backbone 1, formed with projections 13, and blocks 5, articulated to said backbone, formed with recesses 12, into which said projections 13 enter, and each formed with a groove 8 of wedge shape in cross-section, substantially as herein described, for the purposes set forth.

5. In apparatus for transporting loads by means of traveling ropes or cables, the combination of a frame or backbone having a hanger-bearing with a hanger having a flat upper end to work in said bearing and formed with a recess, said hanger-bearing being of triangular form, or approximately so, and formed with a projection to enter the recess in said hanger, substantially as herein described, for the purpose set forth.

6. In apparatus for transporting loads by means of traveling ropes or cables, the combination of a frame or backbone having a hanger-bearing 4 of approximately triangular form in cross-section and provided with projections 25, with a hanger 24 in the form of a flat bar with curved lower edge to rest in said bearing and formed with a recess 25ª to receive said projections 25, substantially as herein described, for the purposes set forth.

In testimony whereof I have signed my name to this specification in the presence of two subscribing witnesses.

JOHN PEARCE ROE.

Witnesses:
 W. CROSS,
 W. R. FROST,
*Both of* 46 *Lincoln's Inn Fields, London,*
 *W. C.*